US008571162B2

(12) United States Patent
Maruyama et al.

(10) Patent No.: US 8,571,162 B2
(45) Date of Patent: Oct. 29, 2013

(54) CONTROL ROD DRIVE MECHANISM

(75) Inventors: Daiki Maruyama, Yokohama (JP);
Tatsutoshi Tokuyama, Yokohama (JP);
Kazuhiro Kawagoe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 924 days.

(21) Appl. No.: 12/557,951

(22) Filed: Sep. 11, 2009

(65) Prior Publication Data

US 2010/0067642 A1     Mar. 18, 2010

(30) Foreign Application Priority Data

Sep. 12, 2008   (JP) ................................ 2008-234957

(51) Int. Cl.
*G21C 7/12*     (2006.01)
*G21C 7/16*     (2006.01)
*G21C 7/00*     (2006.01)

(52) U.S. Cl.
USPC ........... 376/230; 376/207; 376/219; 376/235; 376/327

(58) Field of Classification Search
USPC .......... 376/207, 219, 228, 229, 230–235, 327
See application file for complete search history.

(56) References Cited

U.S. PATENT DOCUMENTS

| | | | | |
|---|---|---|---|---|
| 2,937,984 A * | 5/1960 | Chapellier | ..................... | 376/230 |
| 2,990,356 A * | 6/1961 | Chapellier et al. | ............ | 376/233 |
| 3,089,839 A * | 5/1963 | Liederbach et al. | .......... | 376/233 |
| 3,106,519 A * | 10/1963 | Thomas et al. | ............... | 376/228 |
| 3,170,844 A * | 2/1965 | Nicoll | ............................ | 376/229 |
| 3,445,334 A * | 5/1969 | Humphries, Jr. | ............... | 376/231 |
| 3,448,006 A * | 6/1969 | Ringsmuth et al. | ........... | 376/233 |
| 3,486,975 A * | 12/1969 | Ripley | ......................... | 376/230 |
| 3,627,632 A * | 12/1971 | Acher et al. | ................... | 376/230 |
| 3,651,742 A * | 3/1972 | Winders | ........................ | 376/230 |
| 3,728,219 A * | 4/1973 | Mattern et al. | ................. | 376/230 |
| 3,734,824 A * | 5/1973 | Ripley | ......................... | 376/229 |
| 3,741,867 A * | 6/1973 | Fortescue | ..................... | 376/233 |
| 3,775,247 A * | 11/1973 | Ode et al. | ...................... | 376/235 |
| 3,779,134 A * | 12/1973 | Daublebsky et al. | ......... | 376/235 |
| 3,830,694 A * | 8/1974 | Acher | .......................... | 376/230 |
| 3,852,153 A * | 12/1974 | Maslenok et al. | ............. | 376/235 |
| 4,048,010 A * | 9/1977 | Eschenfelder et al. | ....... | 376/230 |
| 4,092,213 A * | 5/1978 | Nishimura | ..................... | 376/230 |
| 4,518,559 A * | 5/1985 | Fischer et al. | ................ | 376/230 |

(Continued)

FOREIGN PATENT DOCUMENTS

JP     2001-305262     10/2001
JP     2007-132835     5/2007

*Primary Examiner* — Bernarr Gregory
(74) *Attorney, Agent, or Firm* — Oblon, Spivak, McClelland, Maier & Neustadt, L.L.P.

(57) ABSTRACT

A control rod drive mechanism according to the present invention includes a cylindrical guide tube having a latch hole, a hollow piston coupled to the control rod and freely moving up and down within the guide tube, a latch provided in the hollow piston so as to freely swing and freely engaging with and disengaging from the latch hole of the guide tube, and a spring locking the latch to the latch hole of the guide tube. Further, an elevating member having a latch guide which can come into contact with the latch is provided so as to freely move up and down within the guide tube. Further, the latch includes a guide surface coming into contact with the latch guide of the elevating member, and the latch guide includes a guide roller coming into contact with the guide surface of the latch.

6 Claims, 8 Drawing Sheets

(56) References Cited

U.S. PATENT DOCUMENTS

| | | | |
|---|---|---|---|
| 4,521,370 A * | 6/1985 | Fischer et al. | 376/233 |
| 4,826,649 A * | 5/1989 | Batheja et al. | 376/230 |
| 5,110,535 A * | 5/1992 | Dillmann | 376/230 |
| 5,120,489 A * | 6/1992 | Dillmann | 376/230 |
| 5,778,034 A * | 7/1998 | Tani | 376/230 |
| 5,793,826 A * | 8/1998 | Sato et al. | 376/228 |

* cited by examiner

US 8,571,162 B2

CONTROL ROD DRIVE MECHANISM

BACKGROUND OF THE INVENTION

1. Technology Field

The present invention relates to a control rod drive mechanism which controls a reactivity of a reactor core by inserting or drawing a control rod into or out of the reactor core of a reactor pressure vessel.

2. Background Art

In general, a boiling water reactor 30 shown in FIG. 6 has been known. The boiling water reactor 30 includes a reactor pressure vessel 31, a shroud 32 provided within the reactor pressure vessel 31, and a reactor core 34 stored within the shroud 32 and having a lot of fuel assemblies 33 arranged in a lattice-like structure. Further, a lower portion of the reactor pressure vessel 31 is provided with a control rod drive mechanism 41 for inserting or drawing a control rod 35 (refer to FIGS. 7A and 7B) having a cruciform cross section into or out of a gap of the fuel assemblies 33 from the below (refer, for example, to Japanese Patent Application Laid-Open No. 2007-132835).

The control rod drive mechanism 41 is configured to drive an electric motor (not shown) coupled to the control rod 35 so as to regulate a position of the control rod 35 and control a reactivity of the reactor core 34, at a normal time. On the other hand, it is configured to rapidly insert the control rod 35 into the reactor core 34 based on a water pressure drive, in the case of an emergency stop (a scram) of the reactor 30 due to contingencies.

Next, a description will be given of a detailed construction of the conventional control rod drive mechanism 41 with reference to FIGS. 7A, 7B and 8. As shown in FIGS. 7A and 7B, a housing 36 is fixed to a bottom portion of the reactor pressure vessel 31 so as to pass through in a vertical direction, and a cylindrical guide tube 42 having a latch hole 43 (refer to FIG. 8) is fixed into the housing 36. Further, a scram piping 37 supplying a high-pressure water for scram to an inner portion of the guide tube 42 is provided in a lower portion of the housing 36. Further, a hollow piston 45 is provided within the guide tube 42, the hollow piston 45 freely moving up and down within the guide tube 42, and rapidly moving up by being applied a pressure of the high-pressure water for scram at a time of the scram. A ball screw 53 mentioned below is formed in an inner portion of the hollow piston 45 so as to be passable through, and the hollow piston 45 includes a drive piston portion 46 positioned in a lower portion thereof and having a larger diameter than the other portions. The control rod 35 arranged within the reactor core 34 is coupled to an upper end of the hollow piston 45.

Further, as shown in FIG. 8, a pair of latches 47 freely engaging with and disengaging from the latch hole 43 of the guide tube 42 are provided in the drive piston portion 46 of the hollow piston 45 so as to freely swing, and the latch 47 has a trailing portion 47a freely engaging with a latch guide 50 of a ball nut 51 mentioned below. Further, a spring 49 locking the latch 47 to the latch hole 43 of the guide tube 42 is coupled between the drive piston portion 46 and each of the latches 47.

Further, there is provided with the ball nut 51 which freely moves up and down within the guide tube 42, and can freely come into contact with a lower surface of the drive piston portion 46. The ball nut 51 is prevented from rotating with respect to the guide tube 42, and has a pair of latch guides 50 which can come into contact with the respective latches 47.

Further, a ball screw 53 screwed into the ball nut 51 is rotatably provided within the guide tube 42, an electric motor is coupled to a lower end of the ball screw 53, and the electric motor rotatably drives the ball screw 53 in both forward and backward directions, thereby moving up and down the ball nut 51 via a rotation of the ball screw 53.

In the case of the scram of the reactor by using the control rod drive mechanism 41 configured as mentioned above, the high-pressure water for scram is supplied into the guide tube 42 via the scram piping 37, first of all. Next, by being applied a pressure of the high-pressure water for scram, the hollow piston 45 comes away from the ball nut 51 so as to rapidly move up, and the control rod 35 is rapidly inserted into the reactor core 34. Thereafter, the latch 7 provided in the drive piston portion 46 of the hollow piston 45 is locked to the latch hole 43 of the guide tube 42, and the hollow piston 45 is held, whereby the scram is finished.

On the other hand, in the case of drawing the control rod 35 inserted into the reactor core 34 out of the reactor core 34, the ball nut 51 is moved up via the rotation of the ball screw 53 by the electric motor, the latch guide 50 is engaged with the trailing portion 47a of the latch 47. Then, the latch 47 is rotated in a closing direction (toward a center of the guide tube 42) against a spring force of the spring 49, and the latch 47 is detached from the latch hole 43 of the guide tube 42. Accordingly, the hollow piston 45 is mounted to an upper surface of the ball nut 51 by being affected by gravity. Thereafter, it is possible to move down the hollow piston 45 so as to draw the control rod 35 out of the reactor core 34, by moving down the ball nut 51.

However, in the control rod drive mechanism configured as mentioned above, in the case of drawing the control rod out of the reactor core after the scram, it is difficult to detach the latch from the latch hole of the guide tube, if a friction between the latch and the latch guide or between the latch and the drive piston portion is increased due to some reasons. In this case, it is difficult to move down the hollow piston so as to draw the control rod out of the reactor core, and there is a possibility that not only an obstacle is generated in a plant operation, but also it becomes difficult to detach the control rod drive mechanism at a time of a maintenance.

SUMMARY

The present invention has been made in view of the above points, and an object thereof is to provide a control rod drive mechanism which can smoothly and securely draw a control rod out of a reactor core after a scram.

The present invention is a control rod drive mechanism which controls a reactivity of a reactor core by inserting or drawing a control rod into or out of the reactor core of a reactor pressure vessel, the control rod drive mechanism comprising: a cylindrical guide tube fixed to a bottom portion of the reactor pressure vessel, said cylindrical guide tube extending in a vertical direction and having a latch hole; a hollow piston coupled to the control rod, said hollow piston freely moving up and down within the guide tube and rapidly moving up by being applied a pressure of a high-pressure water for scram at a time of a scram; a latch provided in the hollow piston so as to freely swing, said latch freely engaging with and disengaging from the latch hole of the guide tube; a spring coupled between the hollow piston and the latch, said spring locking the latch to the latch hole of the guide tube; an elevating member freely moving up and down within the guide tube, said elevating member freely coming into contact with a lower surface of the hollow piston, and having a latch guide capable of coming into contact with the latch; and a drive portion driving so as to move up and down the elevating member; wherein the latch provided in the hollow piston includes a guide surface coming into contact with the latch guide of the elevating member, the latch is configured to be rotated against a spring force of the spring by the contact of the latch guide with the guide surface, thereby being detached from the latch hole of the guide tube, and wherein, the latch guide includes a guide roller coming into contact with the guide surface of the latch.

The present invention is the control rod drive mechanism, wherein the guide surface of the latch is formed in a circular arc shape so as to protrude outward in the horizontal cross section, and an outer peripheral surface of the guide roller of the latch guide is curved as a concave shape corresponding to the guide surface of the latch over a width direction thereof.

The present invention is the control rod drive mechanism, wherein a guide groove which guides the latch is provided in a lower portion of the hollow piston, and a recess is provided in a side surface of the guide groove.

The present invention is a control rod drive mechanism which controls a reactivity of a reactor core by inserting or drawing a control rod into or out of the reactor core of a reactor pressure vessel, comprising: a cylindrical guide tube fixed to a bottom portion of the reactor pressure vessel, said cylindrical guide tube extending in a vertical direction and having a latch hole; a hollow piston coupled to the control rod, said hollow piston freely moving up and down within the guide tube and rapidly moving up by being applied a pressure of a high-pressure water for scram at a time of a scram; a latch provided in the hollow piston so as to freely swing, said latch freely engaging with and disengaging from the latch hole of the guide tube; a spring coupled between the hollow piston and the latch, said spring locking the latch to the latch hole of the guide tube; an elevating member freely moving up and down within the guide tube, said elevating member freely coming into contact with a lower surface of the hollow piston, and having a latch guide capable of coming into contact with the latch; and a drive portion driving so as to move up and down the elevating member; wherein the latch guide of the elevating member includes a guide surface coming into contact with the latch provided in the hollow piston, rotating the latch against a spring force of the spring and detaching the latch from the latch hole of the guide tube, and wherein the latch includes a latch roller coming into contact with the guide surface of the latch guide.

The present invention is the control rod drive mechanism, wherein the guide surface of the latch guide is formed in a circular arc shape so as to protrude outward in the horizontal cross section, and an outer peripheral surface of the latch roller of the latch is curved as a convex shape corresponding to the guide surface of the latch guide over a width direction thereof.

The present invention is the control rod drive mechanism, wherein a guide groove which guides the latch is provided in a lower portion of the hollow piston, and a recess is provided in a side surface of the guide groove.

According to the present invention, it is possible to smoothly detach the latch from the latch hole of the guide tube so as to smoothly and securely draw the control rod out of the reactor core.

DETAILED DESCRIPTION

A description will be given below of embodiments according to the present invention with reference to the accompanying drawings.
(First Embodiment)

Figure 1B:
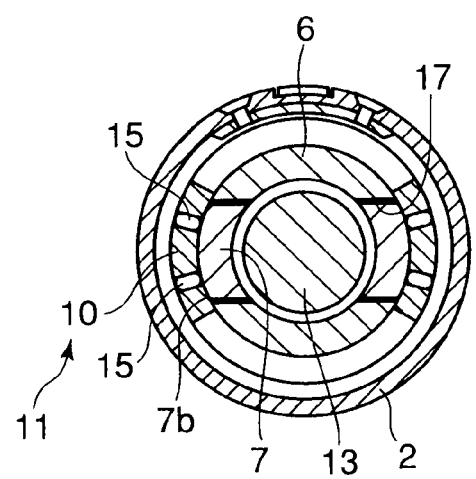
FIG. 1B is a cross sectional view along a line A-A in FIG. 1A.
Figure 1A:
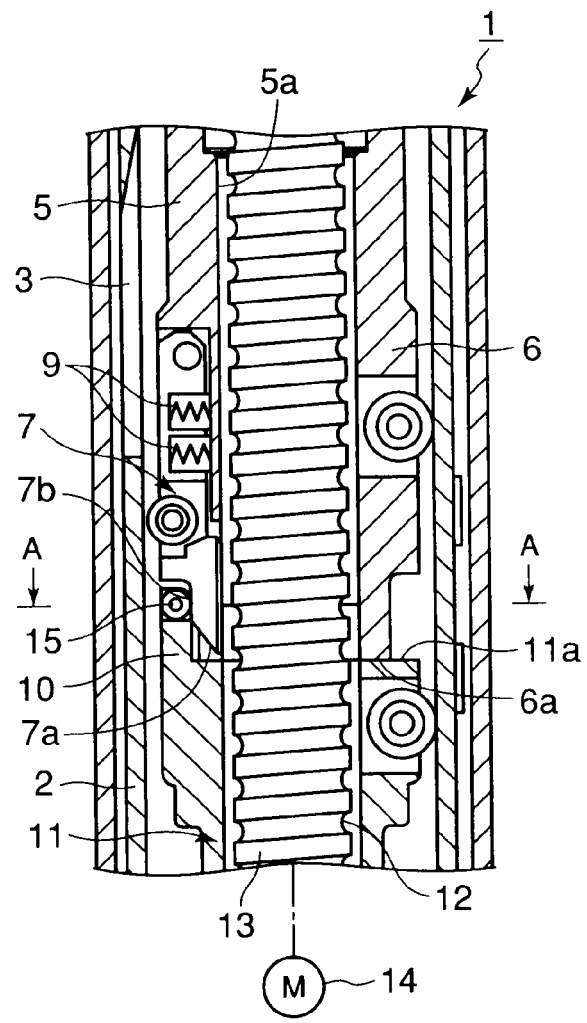
FIG. 1A is a cross sectional view showing a detailed structure of a control rod drive mechanism in a first embodiment according to the present invention.

In this case, FIG. 1A is a cross sectional view showing a detailed structure of a control rod drive mechanism in a first embodiment according to the present invention, and FIG. 1B is a cross sectional view along a line A-A in FIG. 1A.

First of all, a description will be given of the control rod drive mechanism according to the present invention with reference to FIGS. 1A and 1B. In this case, the control rod drive mechanism is provided for controlling a reactivity of a reactor core by inserting or drawing a control rod into or out of a reactor core of a reactor pressure vessel.

Figure 6:
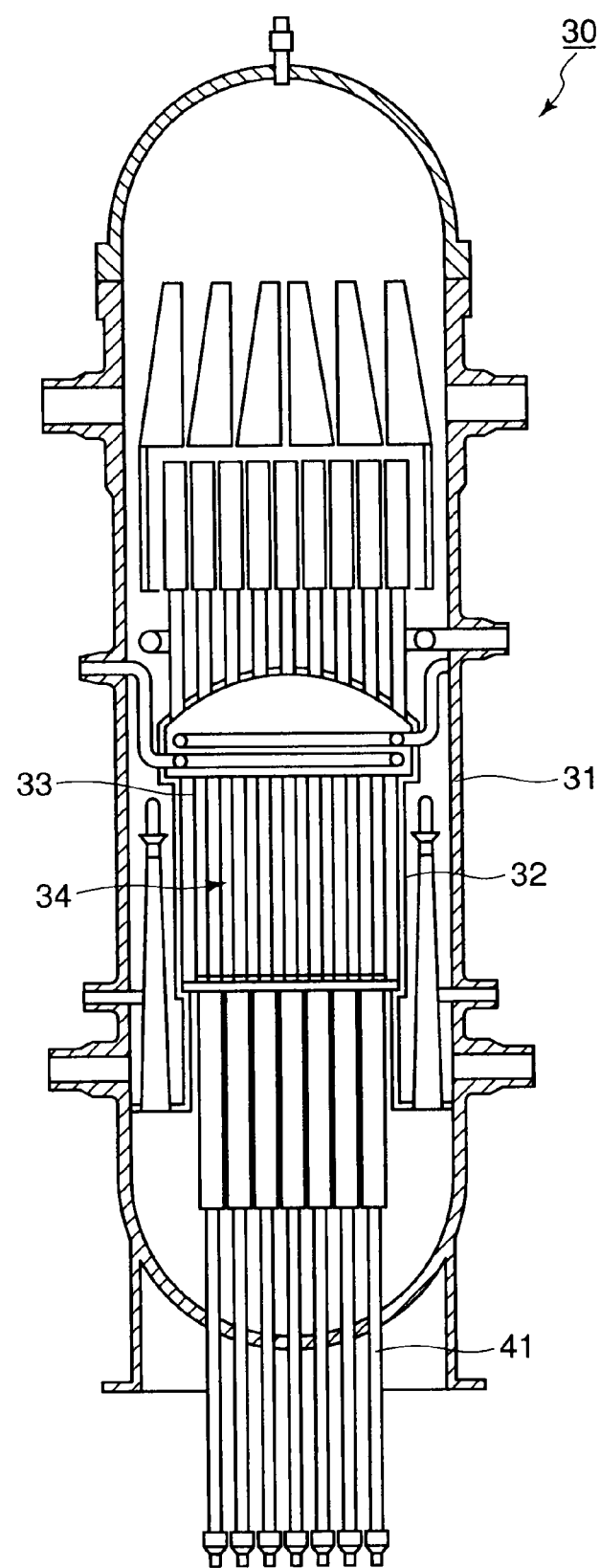
FIG. 6 is a view showing a whole structure of a boiling water reactor.

As shown in FIG. 1A, a control rod drive mechanism 1 comprises a cylindrical guide tube 2 fixed to a bottom portion of a reactor pressure vessel 31 (refer to FIGS. 6, 7A and 7B) via a housing 36 (refer to FIGS. 7A and 7B) and extending in a vertical direction while having a latch hole 3, and a hollow piston 5 coupled to a control rod 35 (refer to FIGS. 7A and 7B) in its upper end, freely moving up and down within the guide tube 2, and rapidly moving up by being applied a pressure of a high-pressure water for scram to a lower surface at a time of the scram. Among them, the hollow piston 5 includes a through hole 5a through which a ball screw 13 mentioned below can pass in its inner portion, and a drive piston portion 6 positioned in a lower portion and having a larger diameter than the other portions. The drive piston portion 6 includes a lower surface 6a which can come into contact with an upper surface 11a of a ball nut 11 mentioned below.

Further, as shown in FIG. 1A, a pair of latches 7 freely engaging with and disengaging from the latch hole 3 of the guide tube 2 are provided in a lower portion of the hollow piston 5, that is, the drive piston portion 6 so as to freely swing. Further, two springs 9 locking the latch 7 to the latch hole 3 of the guide tube 2 are coupled between the drive piston portion 6 and each of the latches 7. Further, as shown in FIG.

1B, a guide groove 17 guiding the rotating latch 7 is provided in the drive piston portion 6 corresponding to each of the latches 7.

Further, as shown in FIG. 1A, the ball nut (an elevating member) 11 is provided so as to freely move up and down within the guide tube 2, and freely come into contact with a lower surface 6a of the drive piston portion 6 of the hollow piston 5. The ball nut 11 has an upper surface 11a which freely comes into contact with the lower surface 6a of the drive piston portion 6, and a pair of latch guides 10 which can come into contact with each of the latches 7. In this case, the ball nut 11 is configured to prevent from rotating with respect to the guide tube 2, and be movable only in a vertical direction, that is, be movable up and down.

Further, the ball screw 13 screwing into the ball nut 11 is rotatably provided within the guide tube 2. The ball screw 13 is positioned coaxially in the guide tube 2, and a ball screw groove 12 is formed in an outer periphery of the ball screw 13. An electric motor (a drive portion) 14 is coupled to a lower end of the ball screw 13, and the electric motor 14 is configured to rotatably drive the ball screw 13 in both forward and backward directions, thereby moving up and down the ball nut 11 via a rotation of the ball screw 13.

Further, as shown in FIG. 1A, the latch 7 provided in the hollow piston 5 includes a guide surface 7a coming into contact with the latch guide 10 of the ball nut 11, and the latch 7 is configured to rotate in a closing direction (to the center side of the guide tube 2) against a spring force of the spring 9, by the contact of the latch guide 10 with the guide surface 7a, and be detached from the latch hole 3 of the guide tube 2. Further, the guide surface 7a of the latch 7 is inclined in such a manner as to be directed to the center side of the guide tube 2 according to heading for the below (the ball nut 11 side).

Further, a hold surface 7b formed in parallel to an axial direction of the guide tube 2 extends upward from the guide surface 7a. It is possible to keep the latch 7 in a closed state against the spring force of the spring 8, by a contact of the latch guide 10 with the hold surface 7b.

Further, as shown in FIG. 1A, the latch guide 10 includes a guide roller 15 coming into contact with the guide surface 7a of the latch 7. As shown in FIG. 1B, in the present embodiment, the latch guide 10 includes two guide rollers 15 corresponding to each of the latches 7. However, the number of the guide rollers 15 provided corresponding to each of the latches 7 is not limited to two.

Next, a description will be given of an operation of the present embodiment formed by the construction mentioned above.

Figure 7A:
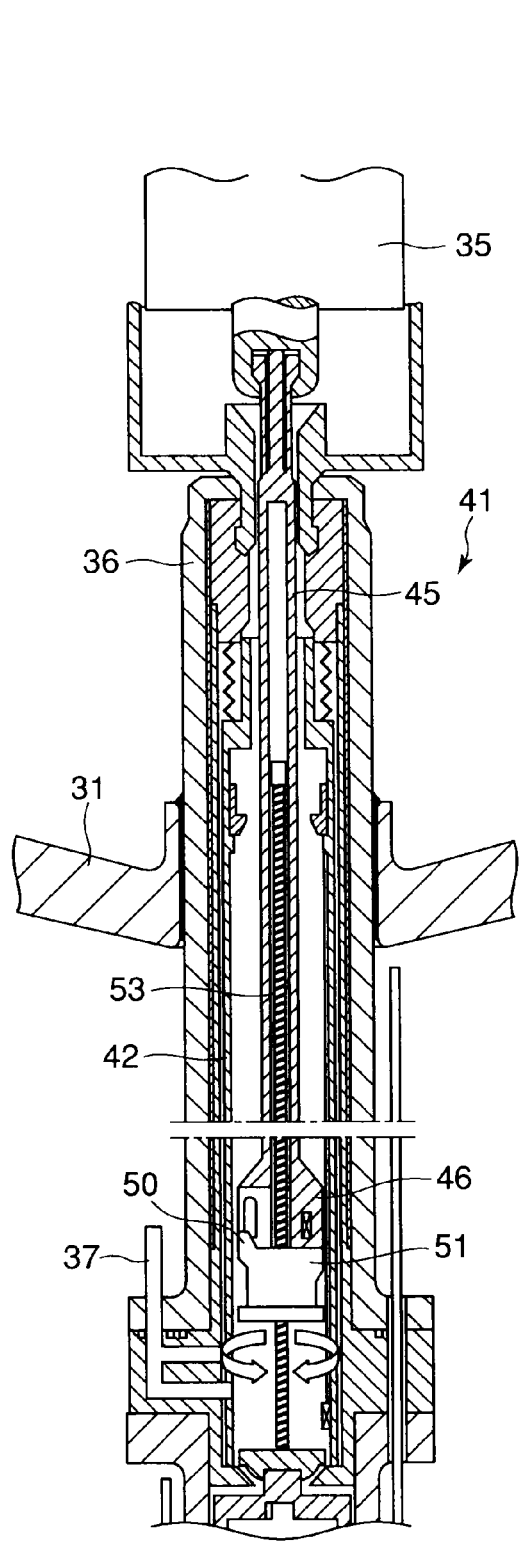
FIG. 7A is a view showing a case where a conventional control rod drive mechanism is electrically driven.
Figure 7B:
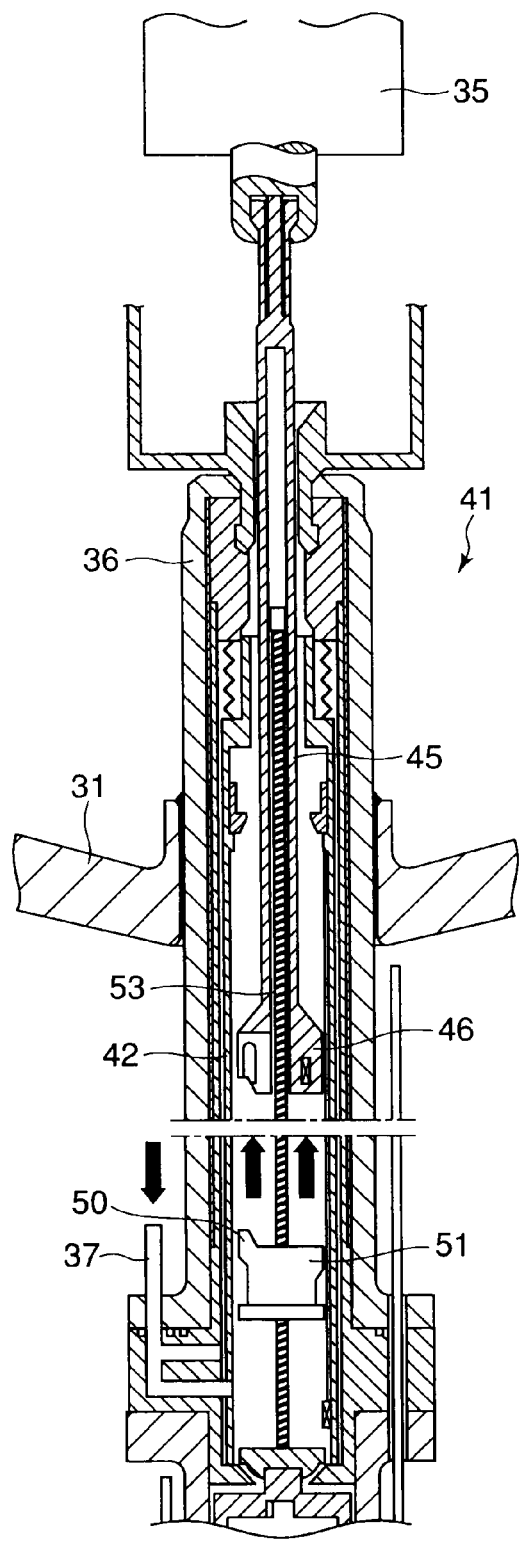
FIG. 7B is a view showing a case where the control rod drive mechanism is hydraulically driven.
Figure 8:
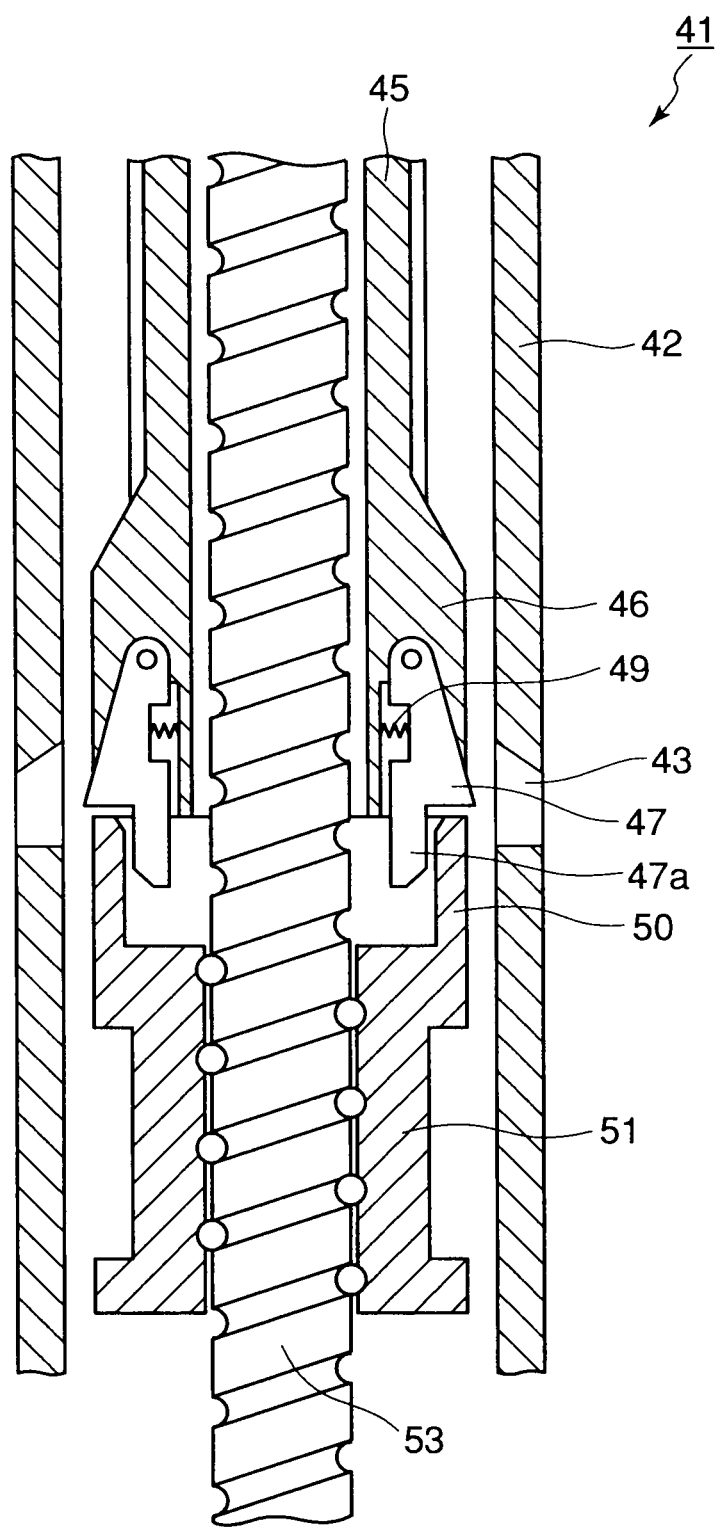
FIG. 8 is a cross sectional view showing a detailed structure of the conventional control rod drive mechanism.

In the case of the scram of the reactor in the control rod drive mechanism 1 shown in FIGS. 1A and 1B, first of all, a high pressure water for scram is supplied into the guide tube 2 via a scram piping 37 (refer to FIGS. 7A and 7B). Accordingly, the hollow piston 5 comes away from the ball nut 11 by being applied a pressure of the high-pressure water for scram so as to rapidly move up, and the control rod coupled to the hollow piston 5 is rapidly inserted into a reactor core (refer to FIG. 6).

Next, the ascending hollow piston 5 reaches a position at which the latch 7 provided in the drive piston portion 6 of the hollow piston 5 corresponds to the latch hole 3 of the guide tube 2, the latch 7 is rotated in an opening direction (to an outer peripheral side of the guide tube 2) by being applied the spring force of the spring 9 coupled between the latch 7 and the hollow piston 5, and the latch is locked to the latch hole 3 of the guide tube 2. Accordingly, the hollow piston 5 is held at the position, and the scram is finished.

On the other hand, in the case of drawing the control rod inserted into the reactor core out of the reactor core, first of all, the ball nut 11 is moved up via the rotation of the ball screw 13 by the electric motor 14. Thereafter, if the ball nut 11 moves up and the upper surface 11a of the ball nut 11 comes close to the lower surface 6a of the drive piston portion 6, the guide roller 15 of the latch guide 10 comes into contact with the guide surface 7a of the latch 7.

In this case, as shown in FIG. 1A, the guide surface 7a of the latch 7 is inclined in such a manner as to be directed to the center side of the guide tube 2 according to heading for the below. Accordingly, the latch 7 is rotated in a closing direction (to the center side of the guide tube 2) against the spring force of the spring 9 by being applied a force from the ascending guide roller 15, and the latch 7 is detached from the latch hole 3 of the guide tube 2.

Next, the hollow piston 5 is mounted to the upper surface 11a of the ball nut 11 by being affected by gravity, and the upper surface 11a of the ball nut 11 comes into contact with the lower surface 6a of the drive piston portion 6 of the hollow piston 5. During this time, the guide roller 15 keeping contact with the guide surface 7a of the latch 7 moves from the guide surface 7a of the latch 7 to the hold surface 7b while rolling, and comes into contact with the hold surface 7b. Accordingly, it is possible to prevent the latch 7 from rotating in the opening direction so as to hold the latch 7 in the closed state, and it is possible to freely move up and down the piston 5 with respect to the guide tube 2.

Next, the rotation of the ball screw 13 is reversely rotated by the electric motor 14, and the ball nut 11 is moved down via the rotation of the ball screw 13. Since the hollow piston 5 is mounted to the upper surface 11a of the ball nut 11 during this time, the hollow piston 5 is moved down together with the ball nut 11. Accordingly, it is possible to move down the control rod so as to draw out of the reactor core.

Incidentally, in the case of driving the reactor, the control rod is moved to a desired position within the reactor core on the basis of the reactivity of the reactor core. Accordingly, it is possible to drive the reactor according to a desired reactivity.

As mentioned above, according to the present embodiment, in the case of drawing the control rod out of the reactor core after the scram, the ball nut 11 moves up by the electric motor 14, the guide roller 15 of the latch guide 10 comes into contact with the guide surface 7a of the latch 7 provided in the drive piston portion 6 of the hollow piston 5, and the latch 7 locked to the latch hole 3 of the guide tube 2 rotates in the closing direction. Thus the latch 7 is detached from the latch hole 3 of the guide tube 2. During this time, the guide roller 15 of the latch guide 10 comes into contact with the guide surface 7a of the latch 7 so as to roll on the guide surface 7a. Accordingly, it is possible to reduce a friction generated between the latch 7 and the latch guide 10. Therefore, it is possible to smoothly detach the latch 7 form the latch hole 3 of the guide tube 2 so as to smoothly and securely draw the control rod out of the reactor core.

(Second Embodiment)

Next, a description will be given of a control rod drive mechanism in a second embodiment according to the present invention with reference to FIGS. 2A and 2B. In this case, FIG. 2A is a cross sectional view showing a detailed structure of the control rod drive mechanism in the second embodiment according to the present invention, and FIG. 2B is a cross sectional view along a line A-A in FIG. 2A.

Figure 2B:
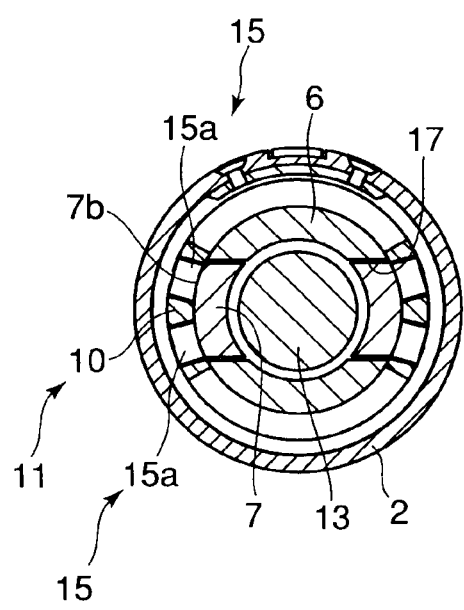
FIG. 2B is a cross sectional view along a line A-A in FIG. 2A.
Figure 2A:
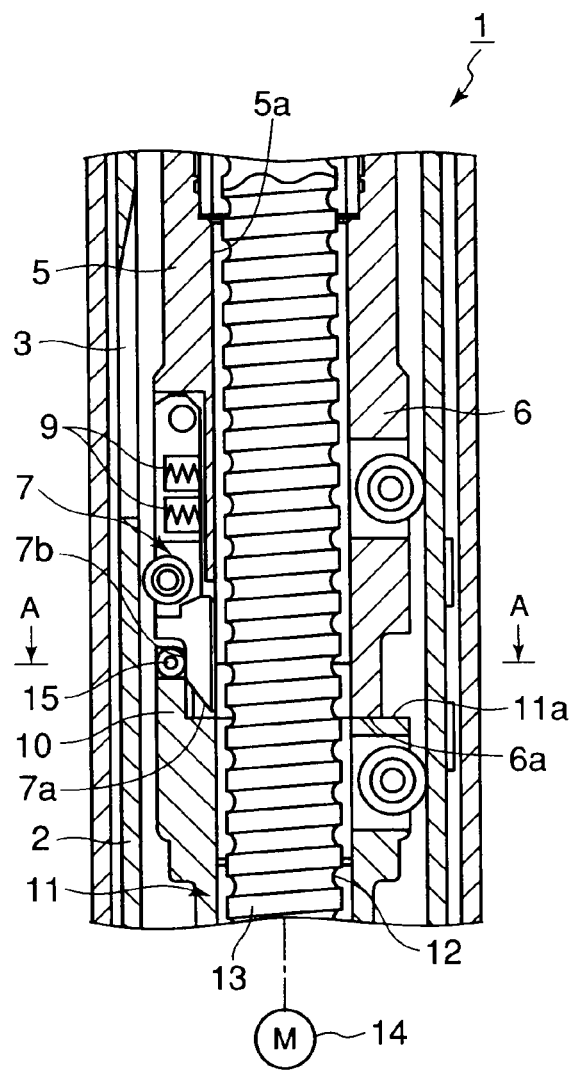
FIG. 2A is a cross sectional view showing a detailed structure of a control rod drive mechanism in a second embodiment according to the present invention.

In the control rod drive mechanism in the second embodiment shown in FIGS. 2A and 2B, a guide roller of a latch guide is mainly different in that it is curved as a concave shape corresponding to a guide surface of a latch over a width direction, and is approximately identical to the first embodiment shown in FIG. 1 in the other structure. In this case, in FIGS. 2A and 2B, the same reference numerals are attached to the same portions as those of the first embodiment shown in FIG. 1, and a detailed description thereof will be omitted.

As shown in FIGS. 2A and 2B, a guide surface 7a of a latch 7 is formed in a circular arc shape so as to protrude outward in the horizontal cross section. Further, an outer peripheral surface 15a of a guide roller 15 of a latch guide 10 is curved as a concave shape based on the guide surface 7a of the latch 7 over a width direction thereof.

As mentioned above, according to the present embodiment, during the contact of the guide roller 15 of the latch guide 10 with the guide surface 7a of the latch 7, it is possible to prevent the guide roller 15 from coming into contact with the guide surface 7a in a biased manner so as to stabilize the contact of the guide roller 15 with the guide surface 7a of the latch 7. Accordingly, it is possible to securely come the guide roller 15 into contact with the guide surface 7a of the latch 7 so as to more smoothly and securely detach the latch 7 from the latch hole 3 of the guide tube 2.

(Third Embodiment)

Next, a description will be given of a control rod drive mechanism in a third embodiment according to the present invention with reference to FIGS. 3A and 3B. In this case, FIG. 3A is a cross sectional view showing a detailed structure of the control rod drive mechanism in the third embodiment according to the present invention, and FIG. 3B is a cross sectional view along a line A-A in FIG. 3A.

Figures 3A, 3B:
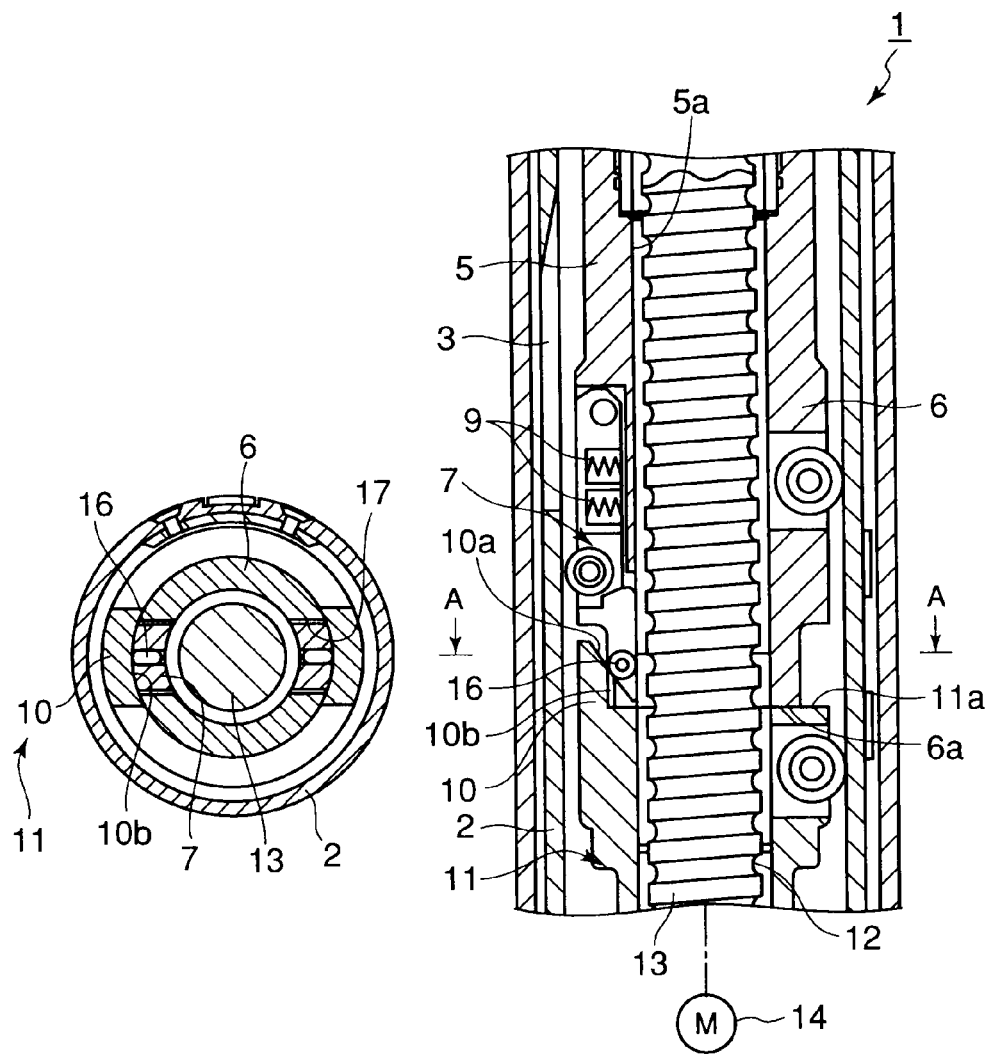
FIG. 3A is a cross sectional view showing a detailed structure of a control rod drive mechanism in a third embodiment according to the present invention.
FIG. 3B is a cross sectional view along a line A-A in FIG. 3A.

In the control rod drive mechanism in the third embodiment shown in FIGS. 3A and 3B, a latch is mainly different in that it includes a latch roller coming into contact with a guide surface of a latch guide, and is approximately identical to the first embodiment shown in FIG. 1 in the other structure. In this case, in FIGS. 3A and 3B, the same reference numerals are attached to the same portions as those of the first embodiment shown in FIG. 1, and a detailed description thereof will be omitted.

As shown in FIGS. 3A and 3B, a latch guide 10 of a ball nut 11 includes a guide surface 10a which comes into contact with a latch 7 provided in a drive piston portion 6 of a hollow piston 5, rotates the latch 7 against a spring force of a spring 9, and detaches the latch 7 from a latch hole 3 of a guide tube 2. The guide surface 10a of the latch guide 10 is inclined so as to be directed to the center side of the guide tube 2 according to heading for the below.

Further, a hold surface 10b formed in parallel to an axial direction of the guide tube 2 extends downward from the guide surface 10a. It is possible to hold the latch 7 in a closed state against the spring force of the spring 9 by a contact of the latch 7 with the hold surface 10b.

Further, the latch 7 includes a latch roller 16 coming into contact with the guide surface 10a of the latch guide 10. As shown in FIG. 3B, in the present embodiment, the latch 7 includes one latch roller 16 corresponding to each of the latch guides 10.

In the control rod drive mechanism 1 shown in FIGS. 3A and 3B, if a ball nut 11 is moved up by an electric motor 14, and an upper surface 11a of the ball nut 11 comes close to a lower surface 6a of a drive piston portion 6, the latch roller 16 of the latch 7 comes into contact with the guide surface 10a of the latch guide 10.

In this case, as shown in FIG. 3A, the guide surface 10a of the latch guide 10 is inclined in such a manner as to be directed to the center side of the guide tube 2 according to heading for the below. Accordingly, the latch 7 is rotated in a closing direction (to the center side of the guide tube 2) against a spring force of a spring 9 by being applied a force from the ascending latch guide 10, and the latch 7 is detached from the latch hole 3 of the guide tube 2.

Next, the hollow piston 5 is mounted to an upper surface 11a of the ball nut 11 by being affected by gravity, and the upper surface 11a of the ball nut 11 comes into contact with the lower surface 6a of the drive piston portion 6 of the hollow piston 5. During this time, the latch roller 16 keeping contact with the guide surface 10a of the latch guide 10 moves from the guide surface 10a of the latch guide 10 to the hold surface 10b while rolling, and comes into contact with the hold surface 10b. Accordingly, it is possible to prevent the latch 7 from rotating in an opening direction so as to hold the latch 7 in a closed state, and it is possible to make the hollow piston 5 freely move up and down with respect to the guide tube 2.

As mentioned above, according to the present embodiment, in the case of drawing the control rod out of the reactor core after the scram, the ball nut 11 moves up by the electric motor 15, the guide surface 10a of the latch guide 10 comes into contact with the latch roller 16 of the latch 7 provided in the drive piston portion 6 of the hollow piston 5, and the latch 7 locked to the latch hole 3 of the guide tube 2 rotates in the closing direction. Thus the latch 7 is detached from the latch hole 3 of the guide tube 2. During this time, the latch roller 16 of the latch 7 comes into contact with the guide surface 10a of the latch guide 10 so as to roll on the guide surface 10a. Accordingly, it is possible to reduce a friction generated between the latch 7 and the latch guide 10. Therefore, it is possible to smoothly detach the latch 7 from the latch hole 3 of the guide tube 2 so as to smoothly and securely draw the control rod out of the reactor core.

(Fourth Embodiment)

Next, a description will be given of a control rod drive mechanism in a fourth embodiment according to the present invention with reference to FIGS. 4A and 4B. In this case, FIG. 4A is a cross sectional view showing a detailed structure of the control rod drive mechanism in the fourth embodiment according to the present invention, and FIG. 4B is a cross sectional view along a line A-A in FIG. 4A.

Figures 4A, 4B:
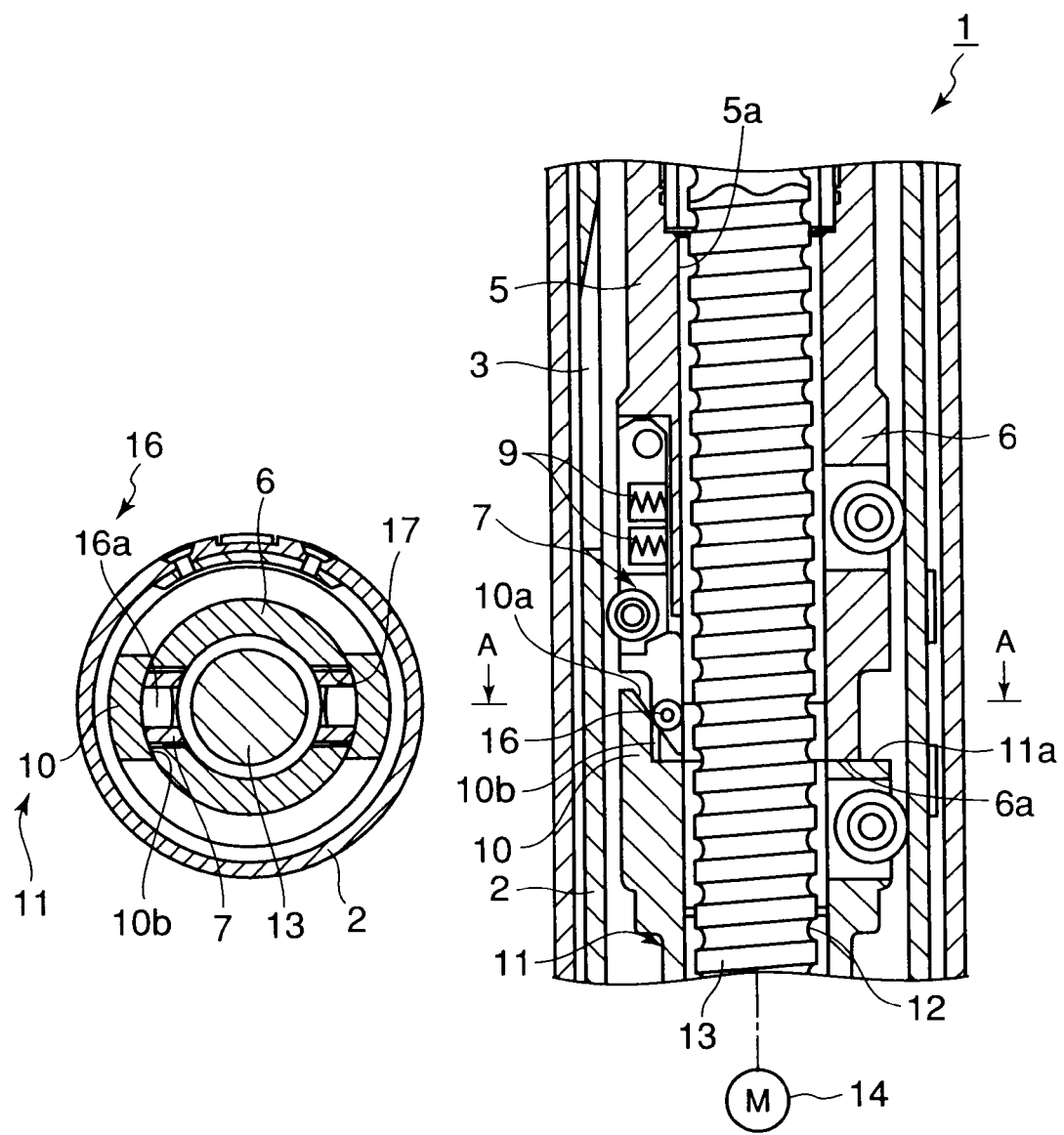
FIG. 4A is a cross sectional view showing a detailed structure of a control rod drive mechanism in a fourth embodiment according to the present invention.
FIG. 4B is a cross sectional view along a line A-A in FIG. 4A.

In the control rod drive mechanism in the fourth embodiment shown in FIGS. 4A and 4B, a latch roller of a latch is mainly different in that it is curved as a convex shape corresponding to a guide surface of a latch guide, and is approximately identical to the third embodiment shown in FIG. 3 in the other structure. In this case, in FIGS. 4A and 4B, the same reference numerals are attached to the same portions as those of the third embodiment shown in FIG. 3, and a detailed description thereof will be omitted.

As shown in FIGS. 4A and 4B, a guide surface 10a of a latch guide 10 is formed in a circular arc shape so as to protrude outward in the horizontal cross section. Further, an outer peripheral surface 16a of a latch roller 16 of a latch 7 is curved as a convex shape corresponding to the guide surface 10a of the latch guide 10 over a width direction thereof.

As mentioned above, according to the present embodiment, during the contact of the latch roller 16 of the latch 7 with the guide surface 10a of the latch guide 10, it is possible to prevent the latch roller 16 from coming into contact with the guide surface 10a in a biased manner so as to stabilize the contact of the latch roller 16 with the guide surface 10a of the latch guide 10. Accordingly, it is possible to securely come the latch roller 16 into contact with the guide surface 10a of the latch guide 10 so as to more smoothly and securely detach the latch 7 from the latch hole 3 of the guide tube 2.

(Fifth Embodiment)

Next, a description will be given of a control rod drive mechanism in a fifth embodiment according to the present invention with reference to FIG. 5. In this case, FIG. 5 is a view showing a guide groove in the control rod drive mechanism in the fifth embodiment according to the present invention.

Figure 5:
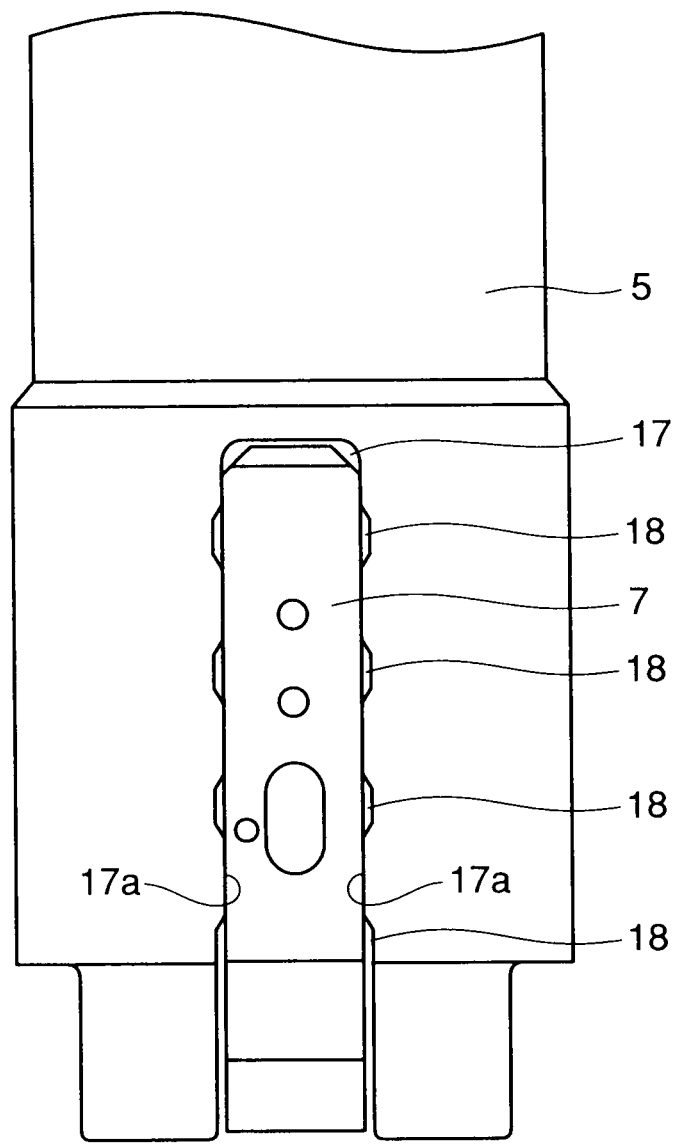
FIG. 5 is a view showing a guide groove in a control rod drive mechanism in a fifth embodiment according to the present invention.

In the control rod drive mechanism in the fifth embodiment shown in FIG. 5, the control rod drive mechanism is mainly different in that a guide groove guiding a rotating latch is provided in a drive piston portion, and a recess is provided in a side surface of the guide groove, and is approximately identical to the first embodiment shown in FIG. 1 in the other structure. In this case, in FIG. 5, the same reference numerals are attached to the same portions as those of the first embodiment shown in FIG. 1, and a detailed description thereof will be omitted.

As shown in FIG. 5, a guide groove 17 guiding a rotating latch 7 is provided in a lower portion of a hollow piston 5, that is, a drive piston portion 6 corresponding to each of the latches 7. Four pairs of recesses 18 are provided in both side surfaces 17a of the guide groove 17. In this case, the number of the recesses 18 is not limited to four pairs, but optional pairs of recesses 18 may be provided.

As mentioned above, according to the present embodiment, since the recesses 18 are provided in both the side surfaces 17a of the guide groove 17 guiding the latch 7, it is possible to reduce a contact area between the latch 7 and the guide groove 17. Accordingly, during the contact of the guide roller 15 of the latch guide 10 with the guide surface 7a of the latch 7 and the rotation of the latch 7 in the closing direction, it is possible to reduce a friction generated between the latch 7 and the drive piston 10. Therefore, it is possible to smoothly detach the latch 7 from the latch hole 3 of the guide tube 2 so as to smoothly and securely draw the control rod out of the reactor core.

The invention claimed is:

1. A control rod drive mechanism which controls a reactivity of a reactor core by inserting or drawing a control rod into or out of the reactor core of a reactor pressure vessel, the control rod drive mechanism comprising:
    a cylindrical guide tube fixed to a bottom portion of the reactor pressure vessel, said cylindrical guide tube extending in a vertical direction and having a latch hole;
    a hollow piston coupled to the control rod, said hollow piston freely moving up and down within the guide tube, wherein said hollow piston moves up via application of high-pressure water for a scram, at a time of occurrence of the scram;
    a latch provided in the hollow piston so as to freely swing, said latch freely engaging with and disengaging from the latch hole of the guide tube;
    a spring coupled between the hollow piston and the latch, said spring applying a spring force in a direction to the side of the guide tube to the latch so as to lock the latch to the latch hole of the guide tube;
    an elevating member freely moving up and down within the guide tube, said elevating member freely coming into contact with a lower surface of the hollow piston, and having a latch guide; and
    a drive portion driving so as to move up and down the elevating member;
    wherein the latch provided in the hollow piston includes a guide surface coming into contact with the latch guide of the elevating member, the latch is configured to be rotated against a spring force of the spring by the contact of the latch guide with the guide surface, thereby being detached from the latch hole of the guide tube, and
    wherein, the latch guide includes a guide roller coming into contact with the guide surface of the latch.

2. The control rod drive mechanism according to claim 1, wherein the guide surface of the latch is formed in a circular arc shape so as to protrude outward in the horizontal cross section, and an outer peripheral surface of the guide roller of the latch guide is curved as a concave shape corresponding to the guide surface of the latch over a width direction thereof.

3. The control rod drive mechanism according to claim 1, wherein a guide groove which guides the latch is provided in a lower portion of the hollow piston, and a recess is provided in a side surface of the guide groove.

4. A control rod drive mechanism which controls a reactivity of a reactor core by inserting or drawing a control rod into or out of the reactor core of a reactor pressure vessel, comprising:
    a cylindrical guide tube fixed to a bottom portion of the reactor pressure vessel, said cylindrical guide tube extending in a vertical direction and having a latch hole;
    a hollow piston coupled to the control rod, said hollow piston freely moving up and down within the guide tube, wherein said hollow piston moves up via application of high-pressure water for a scram, at a time of occurrence of the scram;
    a latch provided in the hollow piston so as to freely swing, said latch freely engaging with and disengaging from the latch hole of the guide tube;
    a spring coupled between the hollow piston and the latch, said spring applying a spring force in a direction to the side of the guide tube to the latch so as to lock the latch to the latch hole of the guide tube;
    an elevating member freely moving up and down within the guide tube, said elevating member freely coming into contact with a lower surface of the hollow piston, and having a latch guide; and
    a drive portion driving so as to move up and down the elevating member;
    wherein the latch guide of the elevating member includes a guide surface coming into contact with the latch provided in the hollow piston, rotating the latch against a spring force of the spring and detaching the latch from the latch hole of the guide tube, and
    wherein the latch includes a latch roller coming into contact with the guide surface of the latch guide.

5. The control rod drive mechanism according to claim 4, wherein the guide surface of the latch guide is formed in a circular arc shape so as to protrude outward in the horizontal cross section, and an outer peripheral surface of the latch roller of the latch is curved as a convex shape corresponding to the guide surface of the latch guide over a width direction thereof.

6. The control rod drive mechanism according to claim 4, wherein a guide groove which guides the latch is provided in a lower portion of the hollow piston, and a recess is provided in a side surface of the guide groove.

* * * * *